(12) United States Patent
Oesterreicher

(10) Patent No.: US 9,305,373 B2
(45) Date of Patent: Apr. 5, 2016

(54) CUSTOMIZED REAL-TIME MEDIA SYSTEM AND METHOD

(71) Applicant: Richard Oesterreicher, Naples, FL (US)

(72) Inventor: Richard Oesterreicher, Naples, FL (US)

(73) Assignee: POTENTIAL DYNAMICS CORP., Naples, FL (US)

( * ) Notice: Subject to any disclaimer, the term of this patent is extended or adjusted under 35 U.S.C. 154(b) by 224 days.

(21) Appl. No.: 14/024,062

(22) Filed: Sep. 11, 2013

(65) Prior Publication Data

US 2014/0071151 A1     Mar. 13, 2014

Related U.S. Application Data

(60) Provisional application No. 61/699,639, filed on Sep. 11, 2012.

(51) Int. Cl.
*G06T 11/00* (2006.01)
*G06T 11/40* (2006.01)
*G06T 15/50* (2011.01)

(52) U.S. Cl.
CPC ............... *G06T 11/001* (2013.01); *G06T 11/40* (2013.01); *G06T 15/503* (2013.01)

(58) Field of Classification Search
CPC ........... G09G 2340/10; G09G 2340/12; G06T 15/005; G06T 2210/61
See application file for complete search history.

(56) References Cited

U.S. PATENT DOCUMENTS 7,281,213 B2 * 10/2007 Callegari ....................... 715/733
2011/0273444 A1 * 11/2011 Saldanha et al. .............. 345/419

* cited by examiner

*Primary Examiner* — Antonio A Caschera
(74) *Attorney, Agent, or Firm* — Schwabe, Williamson & Wyatt, P.C.

(57) ABSTRACT

Interactive media is defined by objects and interaction logic; unique objects for the interactive media are determined according to the interaction logic. The unique objects are pre-rendered and saved. When a user interacts with the interactive media, the user device requests content. The pre-rendered unique elements are determined and composited according to two-pass depth and alpha compositing technique, which technique reduces composting complexity while maintaining quality. The resulting composited media is then streamed to the user device. Some non-pre-rendered objects may be rendered and/or composited by a server- or client-device at run-time.

20 Claims, 12 Drawing Sheets

CUSTOMIZED REAL-TIME MEDIA SYSTEM AND METHOD

CROSS-REFERENCE TO RELATED APPLICATION

This application claims the benefit of provisional application No. 61/699,639, filed Sep. 11, 2012, which application is incorporated into this application by this reference.

FIELD

This disclosure relates to a method and system for preparing media or related files to be served by a media server, serving the prepared media or files, and client interaction with the media or files.

BACKGROUND

The following description includes information that may be useful in understanding the present invention. It is not an admission that any of the information provided herein is prior art or relevant to the presently claimed invention, or that any publication specifically or implicitly referenced is prior art.

Real-time rendering of computer graphics on computing devices means that each frame in the computer graphics is rendered and displayed in less than 30-40 milliseconds. Due to network limitations as well as CPU and GPU limitations in both server and client in a client-server context, real-time customized computer graphics (as is found in interactive video and games) often requires or results in lower resolution, less detail, reduced frame rate, and significantly less visual quality.

Non-real-time rendering of computer graphics can achieve higher resolution, finer-grained detail, increased frame rates, and files compatible with 3D visual presentations. Unfortunately with non-real-time rendering, due to the amount of processing and storage required, each frame can take minutes or hours to render instead of milliseconds. It may take months to render a single feature film at high quality levels. This time simply is not available if a video is to be customized, rendered, and displayed in real-time (in less than 30-40 milliseconds).

Needed is a way to provide real-time interactive or customized media, including video and computer graphics, with a quality at or approaching the quality of non-real-time media.

SUMMARY

Interactive media is defined by objects and interaction logic; unique objects for the interactive media are determined according to the interaction logic. The unique objects are pre-rendered and saved. When a user then interacts with the interactive media, the user device requests or receives content. The required pre-rendered unique elements are determined and composited according to two-pass depth and alpha compositing technique, which technique eliminates visual inaccuracies associated with depth compositing translucent pixel values and improves quality. The resulting composited media is then streamed to the user device. Some non-pre-rendered elements may be rendered and/or composited by a server- or client-device at run-time.

DETAILED DESCRIPTION

Figure 1:
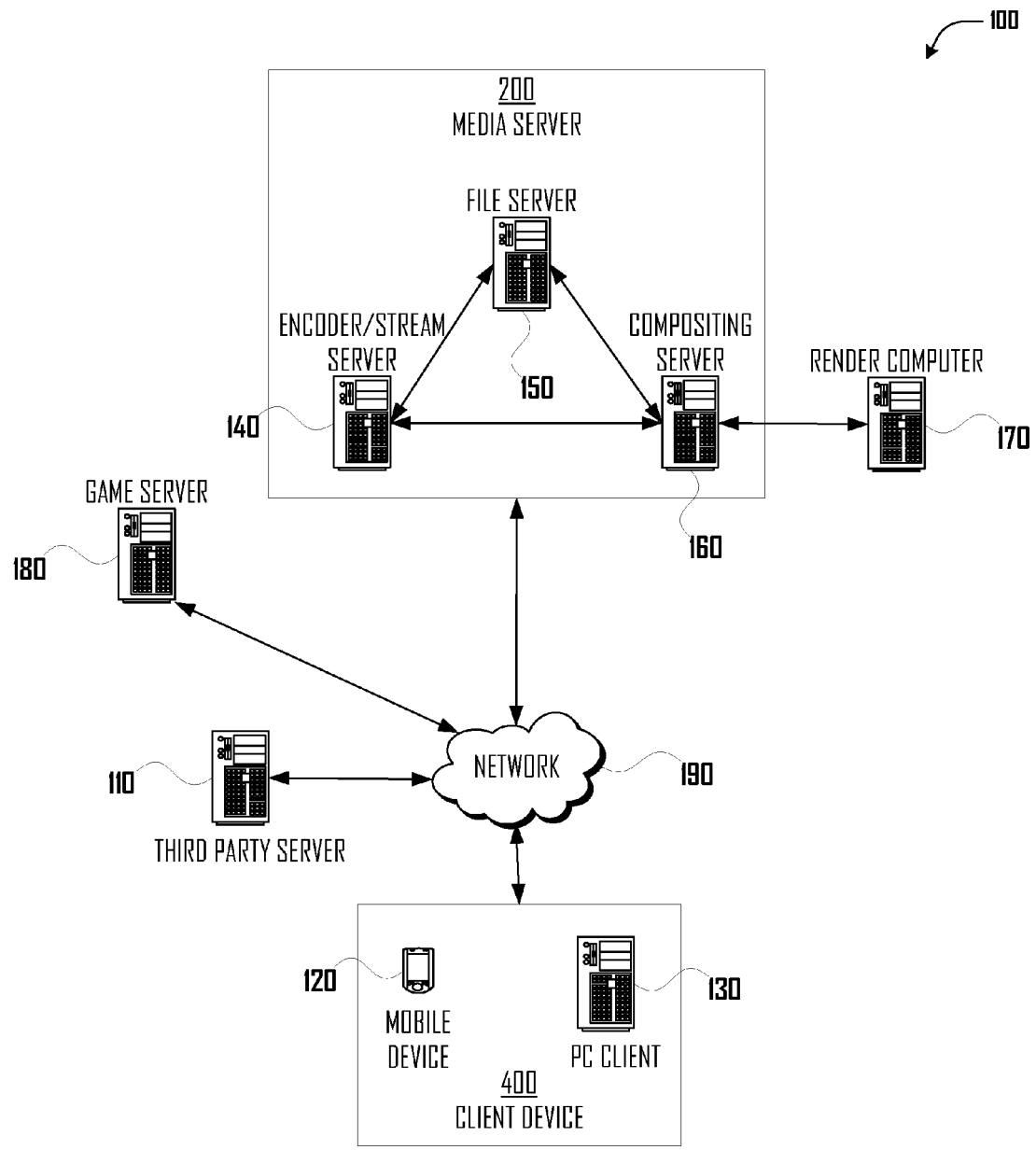
FIG. 1 is a network and device diagram illustrating exemplary computing devices configured according to embodiments disclosed in this paper.

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular.

The word "or," in reference to a list of two or more items, covers all of the following interpretations of the word: any of the items in the list, all of the items in the list, and any combination of one or more of the items in the list.

Certain elements appear in various of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

Interactive media, such as provided through websites and games, involves providing text, audio, images, and video, ("content"), with the content provided according to the interaction logic of the interactive media (such as the interaction logic for a game). The interaction logic defines what content is provided, in what sequence, in response to user (or other) input. As used herein, "Interactive Media" refers to any digital, computer media with which a user may interact through "Interaction Logic." The Interaction Logic may be simple, such as that a static webpage is displayed in response to selection of a URL, or it may be complex and define, for example, how a user interacts with a game, what is displayed when a user rotates the view angle at a certain point in the progression of the game, and similar. The Interaction Logic may be a part of the Interactive Media (as in the case of a computer game) or the Interaction Logic may be separate from the Interactive Media (as in the case of a URL, selection of which results in display of a webpage). As used herein, Real-Time Interactive Media is Interactive Media comprising digital images which are rendered in less than 30-40 milliseconds after the user input which prompts the digital image. As discussed above, Real-Time Interactive Media has not had the same quality, particularly with respect to video, as media not rendered in real-time. The data comprising an Interactive Media instance is illustrated herein by, for example, Interactive Media 325 in the Media Server 200 and Interactive Media 525 in the Client Device 400; the Interactive Media 325 or 525 may comprise or be associated with Interaction Logic 330 (in the Media Server Datastore 300) or Interaction Logic 530 (in the Client Device Datastore 500).

As used herein, "rendering" means to generate, via a rendering routine (referred to herein as a "Render Engine," found in the Media Server 200 as Render Engine 800 and in the Client Device 400 as Client Render Engine 460), a "digital image." There are several rendering algorithms which may be used, such as scanline rendering and rasterization, ray casting, ray tracing, and radiosity, any or all of which may be utilized by or in the context of the techniques discussed herein.

As used herein, a "digital image" is typically a raster graphics file (an array of data representing pixels with a structure which may be interpreted to correspond to pixels in a screen display), though may also (or alternatively) be a vector graphics file (which encodes instructions for creating a raster graphics file from geometrical primitives). The data comprising a digital image is generally illustrated herein by, for example, Digital Image 345 in the Media Server Datastore 300 or Digital Image 545 in the Client Device Datastore.

As used herein, a "Scene 320" is one or more computer files containing or listing "Objects" (such as Object 340) which may occur at different times or at other junctures in an Intereactive Media 325 instance. The Scene 320 is generally represented herein by a Scene 320 entry in the Media Server Datastore 300, it being understood that the Scene 320 may be provided by a set of records, such as a set of Object 340 records, with an identifier, which identifier labels the Object 340 records as comprising a Scene 320. A Scene 320 does not define how a final or resulting digital image is created during the progression of an Interactive Media instance; that is determined by the Compositing Logic which is derived from the Interaction Logic of the Intereactive Media 325 instance. For example, the Interaction Logic may allow the user to change between two tunics, so both tunic objects may be part of the Scene, even though only one tunic may be worn at a time and the visibility of the two tunics are mutually exclusive in terms of final composited images. The Scene 320 defines that both tunic objects may occur in the progression of the Interaction Logic 330 for the Intereactive Media 325 instance.

As used herein, Objects 340 comprise geometry of objects to be rendered in the digital image, viewpoint or camera move ("viewpoint" and "camera move" being equivalent terms, it being understood that the "camera move" refers to a position of a camera relative to the other aspects of the Scene and that the position of the camera does not need to change), texture of objects in the digital image, lighting, and shading information, all of which describe a virtual scene. Examples of Objects 340 comprise environment (trees, ground, structures, etc.), environment customizations (obstacles, cover objects, waving flags, etc.), atmosphere (fog, smoke, particles floating in space, embers in space, etc.), base character (avatar body style, skin color, eye color, etc.), character customizations (hair, apparel, clothing, armor, etc.), character damage (a layer which illustrates damage to a character), weapons (carried by a character), projectiles (bullets, arrows, fireballs, magic effects, etc.), impact effects (explosions, debris, etc.), status and performance recognition (achievement display, badge earning, coins counting up, etc.), screen space effects (color grading, film noise, warping, other effects applied to an entire digital image), and transitions (wipes, cross dissolves, sparkles, other visual elements used to transition from one image to another).

Objects 340 may be components of, for example, Interactive Media 325 (or 525). The Objects 340 may be interpreted by a Render Engine, such as Render Engine 800 (or Client Render Engine 460), and/or by an intermediary program between the Render Engine 800 and the Scene 320, hereinafter the "Interaction Engine," such as Interaction Engine 275 in the Media Server 200 (or Interaction Engine 475 in the Client Device 400) and rendered as digital images (including video). The Interaction Engine 275 executes the "Interaction Logic," such as Interaction Logic 330 in the Media Server 200 or Interaction Logic 530 in the Client Device 400), which Interaction Logic 330 is an instruction set which determines the state of the Interactive Media 325 and what output is provided by the Interactive Media 325, generally over time, in response to user and other non-user input.

As used herein, "display" means to output a rendered digital image in a display, such as Display 440, via a display routine, referred to herein as a "Display Engine," such as Display Engine 470; the Display Engine 470 routine may also be a Client Render Engine 460 routine (the difference only being that a Render Engine routine, such as Render Engine 800, may output to a retained file, whereas the Display Engine 470 may output to Display 440 via transient memory).

As used herein, "compositing" and "to composite" is to generate a third digital image (or images, such as a video) from a first pre-rendered digital image and either a second digital image (which may be pre-rendered) or an effect, such as might be generated through use of lighting metadata. This paper discusses that compositing is performed according to methods performed by a Compositor Engine 900.

FIG. 1 is a network and device diagram illustrating exemplary computing devices configured according to embodiments disclosed in this paper. Illustrated in FIG. 1 are a Media Server 200, a Render Computer 170, a Client Device 400, a Game Server 180, and a Third Party Server 110. While not illustrated as part of the Media Server 200, the Game Server 180 may be part of the Media Server 200; periodically in this paper, components of the Game Server 180 may be described with reference to components illustrated as being part of the Media Server 200 (such as that the Game Server 180 may comprise Interactive media 325, Interaction Logic 330, and that the Game Server 180 may execute an Interaction Engine 275). Generally, the Client Device 400 interacts with a Real-Time Interactive Media 325 instance executed by an Interaction Engine 275 (discussed and illustrated in terms of execution by the Media Server 200, though, these may be executed by the Game Server 180).

The Real-Time Interactive Media instance and Interaction Engine may reside in memory in and be executed by the Client Device 400 (such as Interactive Media 525 executed by the Interaction Engine 475), and/or the Client Device 400 may interact with a remote Real-Time Interactive Media instance, such as at the Game Server 180. Interaction with a remote Real-Time Interactive Media 325 instance may be accomplished, for example, by the Client Device 400 sending credentials to authenticate and authorize the user with respect to the Interactive Media 325 instance (if required) and providing user (and non-user) input to the computer which is executing the Interactive Media 325 instance (such as the Game Server 180), which recipient computer inputs the user (and non-user) input into the Interaction Engine 275, which input is processed according to the Interaction Logic 330 to determine the next output of the Interactive Media 325 (such as "content") and/or the next state of the Interactive Media 325 instance, with the next output being returned to the Client Device 400.

In FIG. 1, the Media Server 200 is illustrated as comprising computers and software and/or modules for a Compositing Server 160, a File Server 150, and an Encoder/Stream Server 140. These may be physically separate computing devices or logically separate processes executed by a common computing device. As noted, the Game Server 180 and the Render Computer 170 may be part of this group. This paper generally discusses the components together, as a Media Server 200, and may mention that a function or step in a process may be performed by a specific one of the components. These components are illustrated in FIG. 1 as connecting directly to one another (such as, for example, an Ethernet connection and/or, if embodied in one computer, via the Bus 220), though the connections may be through the Network 190. If these components are embodied in separate computers, then additional steps may be added to the disclosed invention to recite communicating between the components. The Compositing Server 160 may execute the Compositor Engine 900, described further in, for example, FIG. 10. The File Server 150 may execute the File Manager 700 routine described further in, for example, FIG. 7. The Encoder/Stream Server 140 may encode digital images, such as Digital Images 345, and save them in the File Server 150 and/or stream them to, for example, the Client Device 400.

The Compositing Server 160 is illustrated in FIG. 1 as being in communication with a Render Computer 170. The Render Computer 170 pre-renders Objects 340 into, for example, Pre-Rendered Elements 310, according to the Render Engine 800 process illustrated further in, for example, FIG. 8. The Compositing Server 160 utilizes, for example, the Pre-Rendered Elements 310 when executing the Compositor Engine 900 process. The Render Computer 170 may be part of the Media Server 200, or, as illustrated, may be a distinct physical and logical computing device; periodically in this paper, components of the Render Computer 170 may be described with reference to similar such components illustrated as being part of the Media Server 200. The Render Computer 170 is not illustrated in FIG. 1 as connecting to the Network 190, though it may do so.

The Client Device 400 is illustrated in FIG. 1 as an example of computing devices such as, for example, a Mobile Device 120 and PC Client 130. A Mobile Device 120 may be, for example, a mobile phone, a tablet or laptop computer. A PC Client 130 may be, for example, a personal computer or a dedicated gaming computer. The Client Device 400 represents any computing device capable of rendering a digital image via, for example, a Display Engine 470. The Client Device 400 is an example of a computer used by an end user to execute a Display Engine 470 and, optionally, a Client Render Engine 460, a Client Compositor Engine 465, and an Interaction Engine 475. Client Devices are used by "users."

The Third Party Server 110 illustrated in FIG. 1 may be any computer. The Network 190 comprises computers, network connections among the computers, and software routines to enable communication between the computers over the network connections. Examples of the Network 190 comprise an Ethernet network, the Internet, and/or a wireless network, such as a GSM, TDMA, CDMA, EDGE, HSPA, LTE or other network provided by a wireless service provider, or a television broadcast facility. Connection to the Network 190 may be via a Wi-Fi connection. More than one network may be involved in a communication session between the illustrated devices. For example, the Client Device 400 may send data to the Game Server 180 via the Internet and receive digital images via a television broadcast facility. Connection to the Network 190 may require that the computers execute software routines which enable, for example, the seven layers of the OSI model of computer networking or equivalent in a wireless phone network.

Generally (a more detailed description is provided below), the Render Computer 170 pre-renders Objects in Interactive Media 325, such as, for example, a computer game, creating Pre-Rendered Elements. To create Pre-Rendered Elements (as discussed further below) requires navigating the Interaction Logic for an Interactive Media instance and identifying or receiving all of the combinations of Objects allowed or required by the Interaction Logic and the Interactive Media instance. To prevent these combinations from exploding in a multiplicative manner (which would result in an unmanageable amount of data), the Objects for each Scene are rendered as Pre-Rendered Elements with depth information per pixel, which depth information prevents "explosion" because a minimal number of Pre-Rendered Elements can be stored (or saved) and composited together when requested or required to recreate any and all possible combinations of a particular Interactive Media instance.

As a user interacts with the Interactive Media 325 via an Interaction Engine, such as Interaction Engine 275, the Interactive Engine 275 requests digital images according to the Interaction Logic 330, the user's interaction input, and the Compositing Logic. The Media Server 200, such as via the Compositing Server 160 and the Compositor Engine 900, converts the requests for digital images into requests for Pre-Rendered Elements, composites the Pre-Rendered Elements into digital images, such as video, and serves or streams the digital images to the Client Device 400. The Client Device 400 may display the digital images, such as by outputting media; optionally, the Client Device 400 and/or the Media Server 200 may render certain real-time Objects 340 and/or may composite certain Pre-Rendered Elements 520 prior to final compositing and display on the Client Device 400. The latter may be the case when, for example, the Media Server 200 prepares Pre-Rendered Elements 310 for a particular Interactive Media instance, such as a game, which Pre-Rendered Elements 310 are transmitted to the Client Device 400 and saved as Pre-Rendered Elements 520. The Client Device 400 may then execute the Interactive Media 525 and Interaction Logic 530 (locally) and composite, such as with Client Compositor Engine 465, the Pre-Rendered Elements 520 without a network connection. This is one example of the way the processes described herein may be distributed other than in a traditional client-server relationship.

This paper may discuss a first computer as connecting to a second computer (such as a Client Device 400 connecting to the Media Server 200) or to a corresponding datastore (such as to Media Server Datastore 300); it should be understood that such connections may be to, through, or via the other of the two components (for example, a statement that a computing device connects with or sends data to the Media Server 200 should be understood as saying that the computing device may connect with or send data to the Media Server Datastore 300). References herein to "database" should be understood as equivalent to "datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

Figure 2:
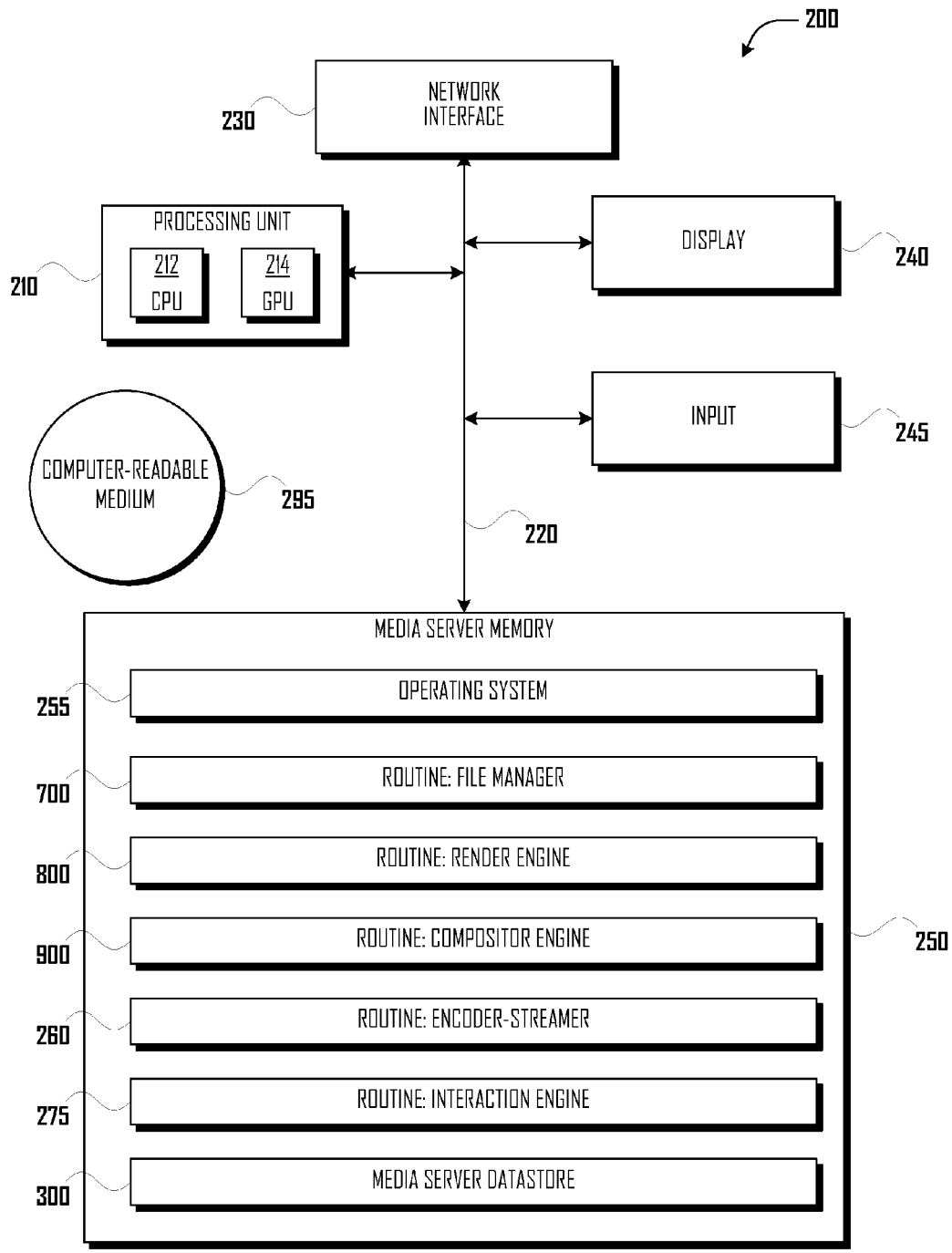
FIG. 2 is a functional block diagram of an exemplary Media Server computing device and some data structures and/or components thereof.

FIG. 2 is a functional block diagram of an exemplary Media Server computing device and some data structures and/or components thereof. The Media Server 200 in FIG. 2 comprises at least one Processing Unit 210, Media Server Memory 250, a Display 240 and Input 245, all interconnected along with the Network Interface 230 via a Bus 220. The Processing Unit 210 may comprise one or more general-purpose Central Processing Units ("CPU") 212 as well as one or more special-purpose Graphics Processing Units ("GPU") 214. The components of the Processing Unit 210 may be utilized by the Operating System 255 for different functions required by the routines executed by the Media Server. The Network Interface 230 may be utilized to form connections with the Network 190 or to form device-to-device connections with other computers. The Media Server Memory 250 generally comprises a random access memory ("RAM"), a read only memory ("ROM"), and a permanent mass storage device, such as a disk drive or SDRAM (synchronous dynamic random-access memory). The Media Server Memory 250 stores program code for software routines, such as, for example, a File Manager 700 routine, a Render Engine 800 routine, a Compositor Engine 900 routine, an Encoder-Streamer 260 routine, an Interaction Engine 275 routine, as well as, for example, browser, email client and server routines, client applications, and database applications (discussed further below). In addition, the Media Server Memory 250 also stores an Operating System 255. These software components may be loaded from a non-transient Computer Readable Storage Medium 295 into Media Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supporting input modalities, Input 245, such as, for example, a touchscreen, a camera, a keyboard, a mouse, a trackball, a stylus, motion detectors, and a microphone. The Input 245 may also serve as a Display 240, as in the case of a touchscreen display which also serves as Input 245, and which may respond to input in the form of contact by a finger or stylus with the surface of the Input 245.

Figure 3:
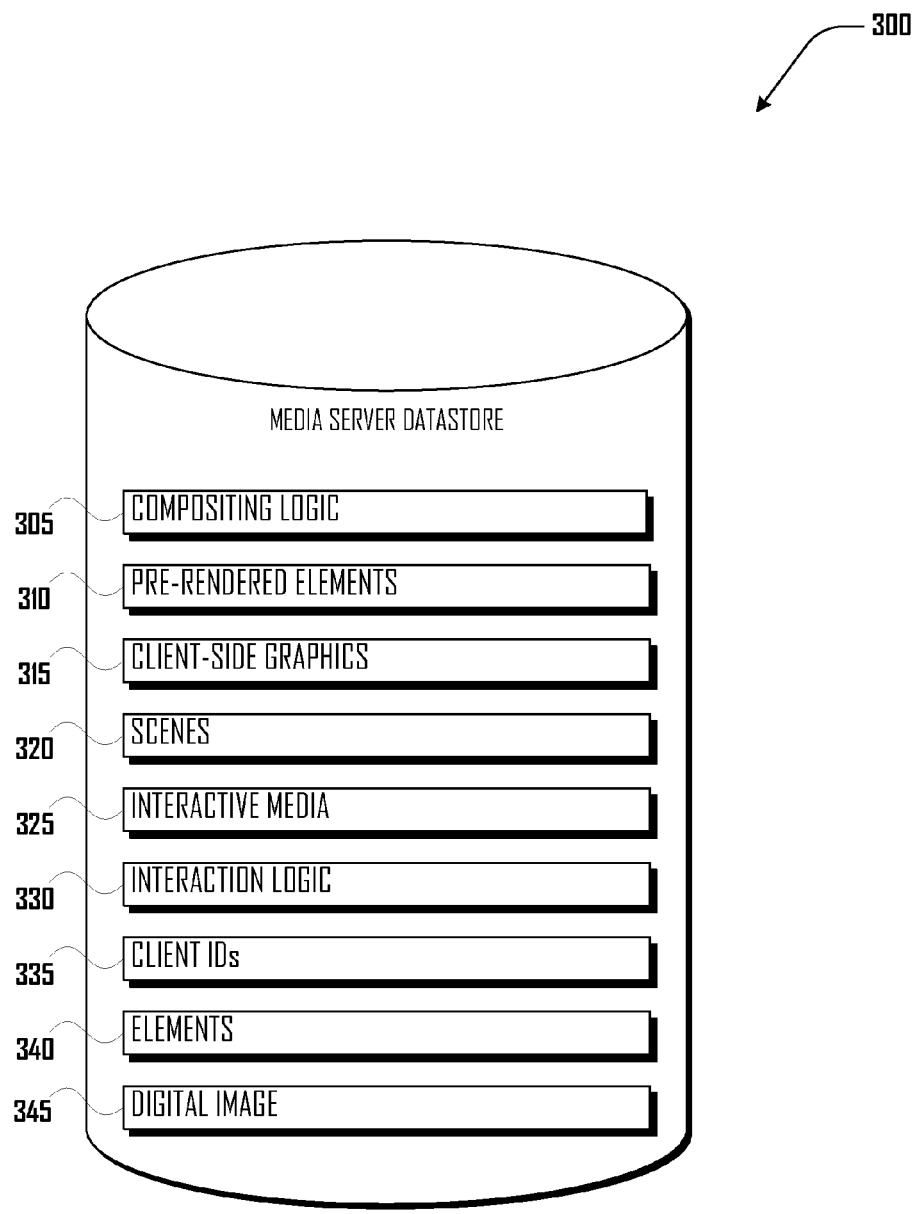
FIG. 3 is a functional block diagram of the Media Server Datastore illustrated in the computing device of FIG. 2.

The computing device 200 may also comprise or communicate via Bus 220 with Media Server Datastore 300, illustrated further in FIG. 3. In various embodiments, Bus 220 may comprise a storage area network ("SAN"), a high speed serial bus, and/or via other suitable communication technology. In some embodiments, the Media Server 200 may communicate with the Media Server Datastore 300 via Network Interface 230. The Media Server 200 may, in some embodiments, include many more components than those shown in this Figure. However, it is not necessary that all of these generally conventional components be shown in order to disclose an illustrative embodiment.

The Media Server 200 illustrated in FIG. 2 comprises data groups for routines, such as routines for a File Manager 700, a Render Engine 800, a Compositor Engine 900, an Encoder-Streamer 260, and an Interaction Engine 275. Additional data groups for routines, such as for a webserver and web browser, may also be present on and executed by the Media Server 200. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

FIG. 3 is a functional block diagram of the Media Server Datastore illustrated in the computing device of FIG. 2. The components of the Media Server Datastore 300 are data groups used by routines and are discussed further herein in the discussion of other of the Figures.

The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
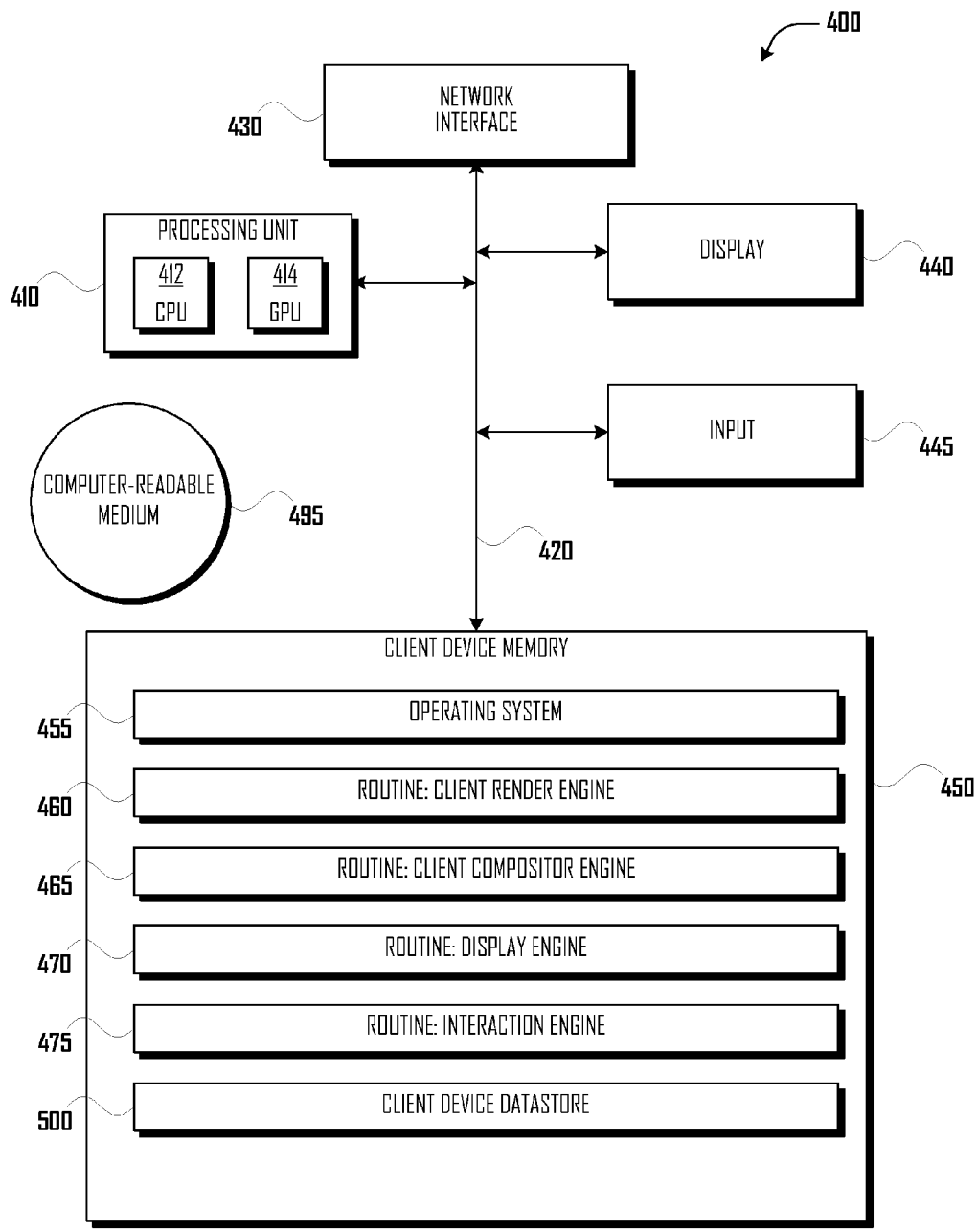
FIG. 4 is a functional block diagram of an exemplary Client Device computing device and some data structures and/or components thereof.

FIG. 4 is a functional block diagram of an exemplary Client Device computing device and some data structures and/or components thereof. The Client Device 400 in FIG. 4 comprises at least one Processing Unit 410, Client Device Memory 450, a Display 440 and Input 445, all interconnected along with the Network Interface 430 via a Bus 420. The Processing Unit 410 may comprise one or more general-purpose Central Processing Units ("CPU") 412 as well as one or more special-purpose Graphics Processing Units ("GPU") 414. The components of the Processing Unit 410 may be utilized by the Operating System 455 for different functions required by the routines executed by the Client Device 400. The Network Interface 430 may be utilized to form connections with the Network 190 or to form device-to-device connections with other computers. The Client Device Memory 450 generally comprises a random access memory ("RAM"), a read only memory ("ROM"), and a permanent mass storage device, such as a disk drive or SDRAM (synchronous dynamic random-access memory). The Client Device Memory 450 stores program code for software routines, such as, for example, a Client Render Engine 460 routine, a Client Compositor Engine 465 routine, a Display Engine 470 routine, an Interaction Engine 475 routine, as well as, for example, browser, email client and server routines, client applications, and database applications (discussed further below). In addition, the Client Device Memory 450 also stores an Operating System 455. These software components may be loaded from a non-transient Computer Readable Storage Medium 495 into Client Device Memory 450 of the computing device using a drive mechanism (not shown) associated with a non-transient Computer Readable Storage Medium 495, such as a floppy disc, tape, DVD/CD-ROM drive, memory card, or other like storage medium. In some embodiments, software components may also or instead be loaded via a mechanism other than a drive mechanism and Computer Readable Storage Medium 495 (e.g., via Network Interface 430).

The Client Device 400 may also comprise hardware supporting input modalities, Input 445, such as, for example, a touchscreen, a camera, a keyboard, a mouse, a trackball, a stylus, motion detectors, and a microphone. The Input 445 may also serve as a Display 440, as in the case of a touchscreen display which also serves as Input 445, and which may respond to input in the form of contact by a finger or stylus with the surface of the Input 445.

Figure 5:
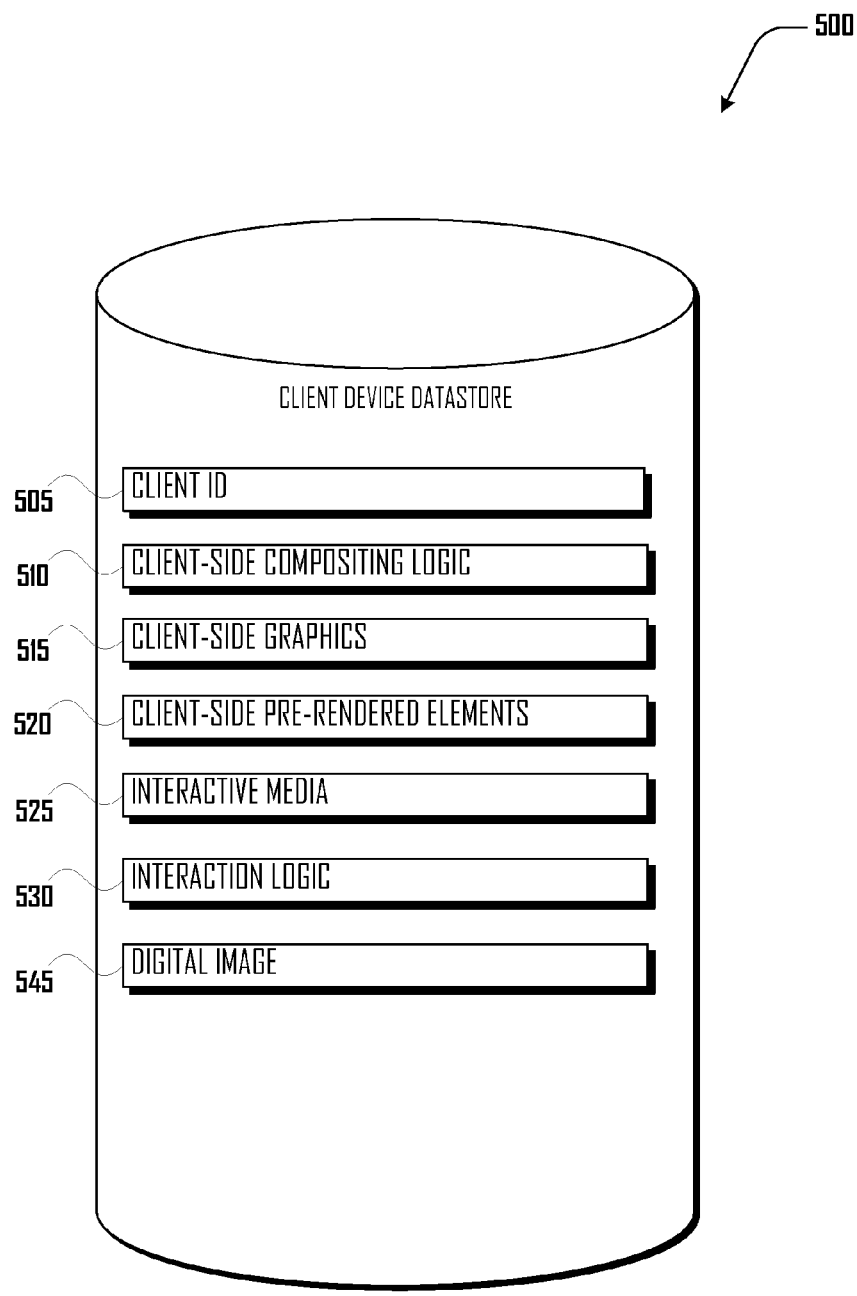
FIG. 5 is a functional block diagram of the Client Device Datastore illustrated in the computing device of FIG. 4.

The Client Device 400 may also comprise or communicate via Bus 420 with Client Device Datastore 500, illustrated further in FIG. 5. In various embodiments, Bus 420 may comprise a storage area network ("SAN"), a high speed serial bus, and/or via other suitable communication technology. In some embodiments, the Client Device 400 may communicate with the Client Device Datastore 500 via Network Interface 430. The Client Device 400 may, in some embodiments, include many more components than those shown in this Figure. However, it is not necessary that all of these generally conventional components be shown in order to disclose an illustrative embodiment.

The Client Device 400 illustrated in FIG. 4 comprises data groups for routines, such as routines for a Client Render Engine 460, a Client Compositor Engine 465, a Display Engine 470, and an Interaction Engine 475. Additional data groups for routines, such as for a webserver and web browser, may also be present on and executed by the Client Device 400. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

FIG. 5 is a functional block diagram of the Client Device Datastore illustrated in the computing device of FIG. 4. The components of the Client Device Datastore 500 are data groups used by routines and are discussed further herein in the discussion of other of the Figures.

The data groups used by routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 6A:
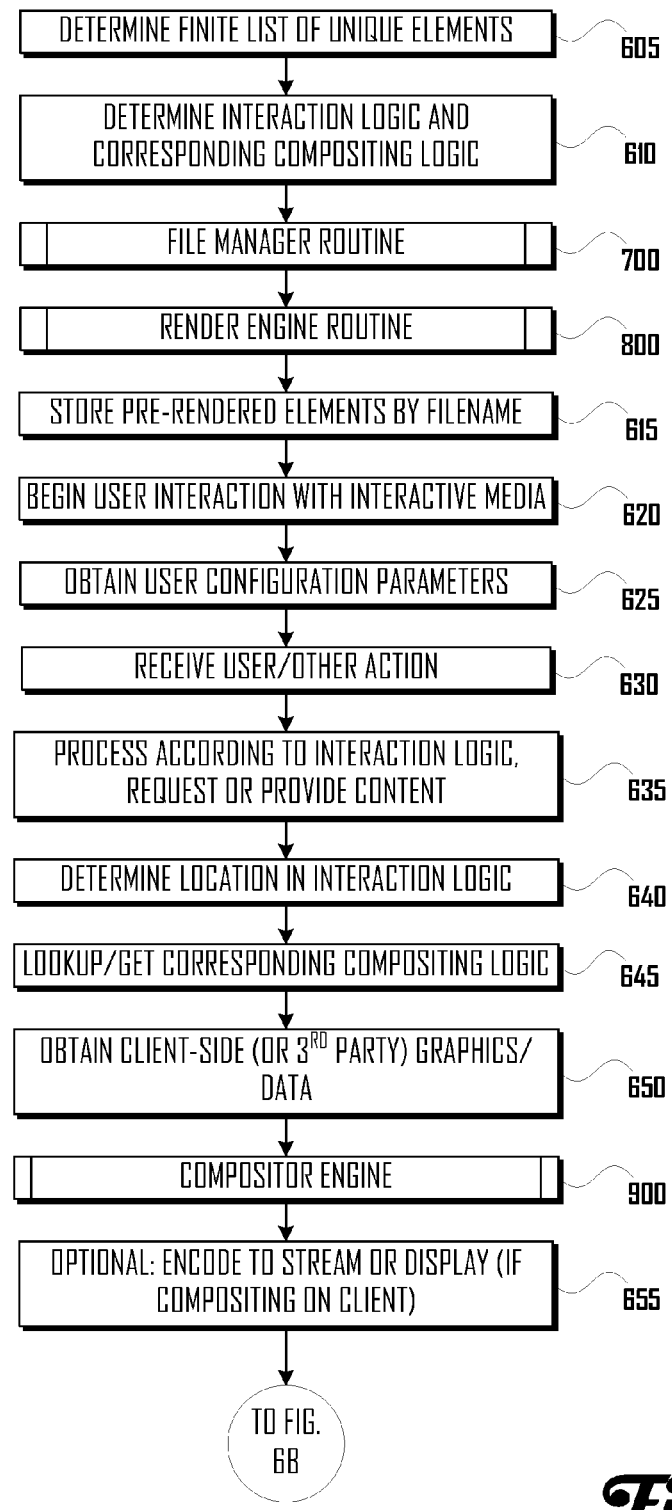
FIGS. 6A and 6B comprise a flowchart illustrating an overview of a process in which the Render Computer pre-renders Elements, the Media Server receives a Client Device request, composites media, and streams or sends the media to the Client Device.
Figure 6B:
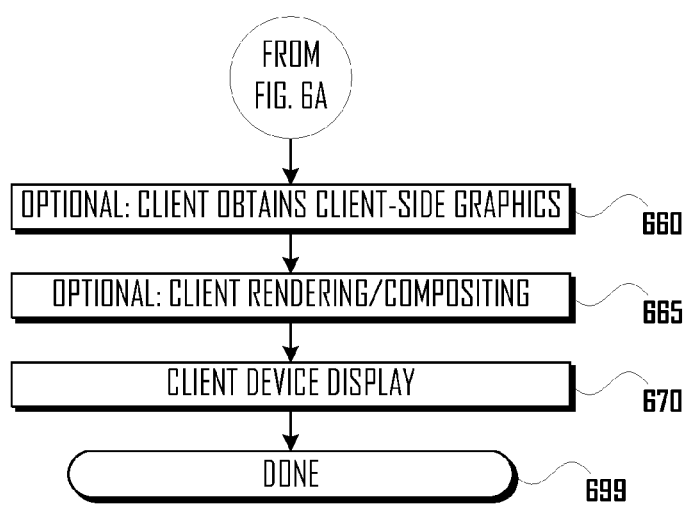

FIGS. 6A and 6B comprise a flowchart illustrating an overview of a process in which the Render Computer pre-renders Elements, the Media Server receives a Client Device request, composites media, and streams or sends the media to the Client Device. At step 605, a finite list of unique Objects 340 is created, obtained, or determined relative to an Interactive Media instance, such as Interactive Media 325. The unique Objects 340 may be determined, such as by navigating the Interactive Media 325 according to its Interaction Logic 330, or may be obtained, such as from a file-set within the Interactive media 325, or may be created. At step 610, the Compositing Logic 305 corresponding to the Interaction Logic 330 may be determined. While the Interaction Logic 330 may be determined by navigating the Interactive Media 325 (such as at step 605), the Compositing Logic 305 may be determined by determining the Objects 340 or Pre-Rendered Elements required to fulfill the output requirements of the Interaction Logic 330, generally utilizing the Objects 340 in the Scenes 320. The Compositing Logic 305 thus closely follows the Interaction Logic 330, though may diverge therefrom and may be changed, independent of the Interaction Logic 330 (the Compositing Logic 305 may be updated, even if the Interaction Logic 330 and/or Objects 340 have not changed). The Compositing Logic 305 may have a branching tree structure when executed at runtime, though it may have and/or be approached via a different structure in other contexts.

Figure 7:
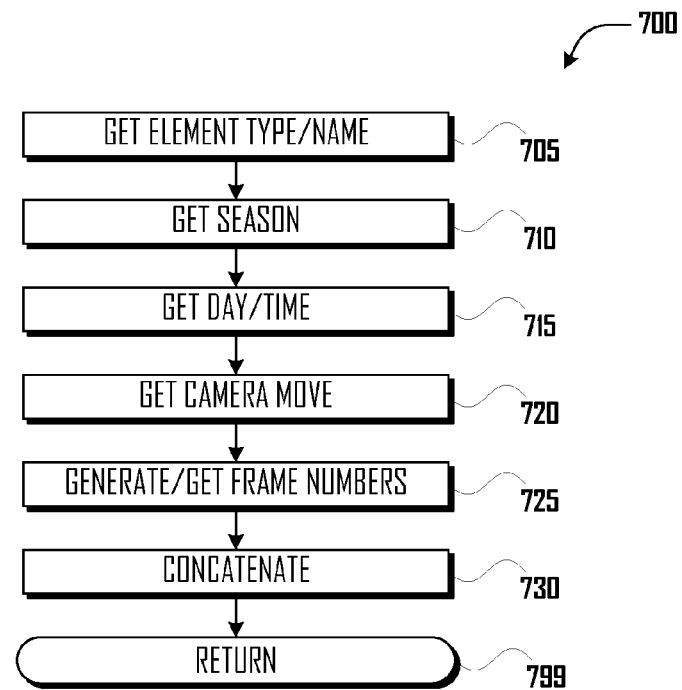
FIG. 7 is a flowchart illustrating a detail of a File Manager routine or subroutine for generating filenames for Pre-Rendered Elements, as may be practiced within the process illustrated in FIG. 6.

At step 700, the Media Server 200, such as through the File Server 150, and the File Manager 700 routine may generate filenames for files to be generated from the Objects 340 in the Scenes 320. A systematic process may be followed to generate filenames in a consistent manner, using identifiers from or associated with each of the Objects 340. FIG. 7 illustrates an example of such a process in the File Manager 700 routine. At step 705 the Object 340 type or name may be obtained, such as from the Interaction Logic 330, or assigned. At step 710, the season, if any, for the particular instance of the Object 340 may be obtained, such as from the Interaction Logic 330, or assigned. At step 715, the day and time of day, if any, for the particular instance of the Object 340 may be obtained, such as from the Interaction Logic 330, or assigned. At step 720, the camera move or viewpoint, if any, for the particular instance of the Element may be obtained from a camera move component of the Object 340. Each Scene 320 may have multiple camera moves or viewpoints (resulting in a different filename for each). At step 725, frame numbers for frames to be generated for the particular instance of the Object 340 may be generated or obtained. Other identifiers for the particular instance of the Object 340 may be obtained. At step 730, the identifiers may be concatenated. Following are examples of filenames which may be generated through this process:

Enchanted Jungle Side A>Summer>Time of Day 1400>Cam Truck Zone A2 to B6 Dur 180>Frame_[0001-0180].ext Enchanted Jungle Side B>Winter>Time of Day 2300>Cam Dolly Zone B1 to B3 Dur 180>Frame_[0001-0180].ext Male Body Style 001>Outfit 009>Cam Truck Zone A2 to B6 Dur 090>Anim Idle Scan Horizon>Frame_[0001-0090].ext Female Body Style 004>Outfit 023>Cam Truck Zone A2 to B6 Dur 020>Anim Cast Spell 138>Frame_[0001-0020].ext At step 799, the process may return to, for example, to FIG. 6 and step 800. At step 800, the Media Server, such as through the Render Computer 170, and the Render Engine 800 routine pre-renders the Object 340 instances for each Scene 320 in a multi-pass process, producing Pre-Rendered Elements. This step is illustrated further in FIG. 8.

Figure 8:
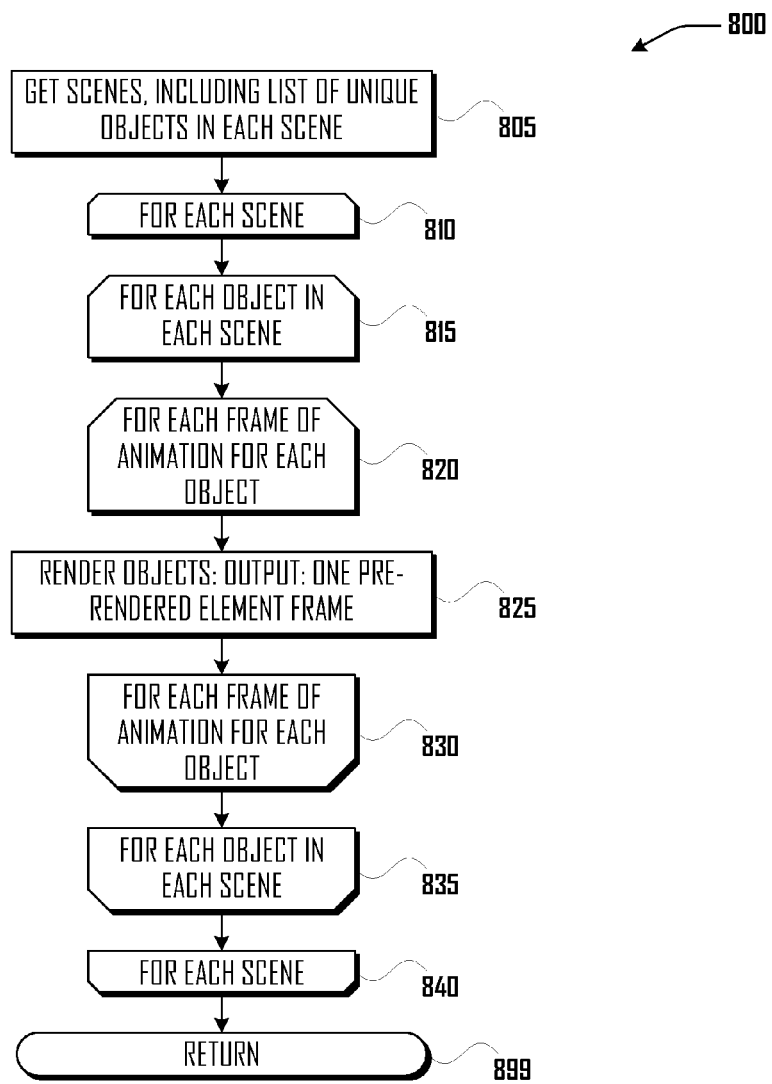
FIG. 8 is a flowchart illustrating a detail of a Render Engine routine or subroutine for preparing Pre-Rendered Elements, as may be practiced within the process illustrated in FIG. 6.

FIG. 8 is a flowchart illustrating a detail of a Render Engine routine or subroutine for preparing Pre-Rendered Elements, as may be practiced within the process illustrated in FIG. 6. At step 805, the Scenes 320 for the Interactive Media 325 are obtained, including the list of unique Objects 340 in each Scene 320. Steps 810 to 840 may iterate for each Scene 320. Steps 815 to 835 may iterate for each Object 340 in each Scene 320. Steps 820 to 830 may iterate for each frame of animation for each Object 340 in each Scene 320. At step 825, the Objects 340 are rendered, outputting one frame of Pre-Rendered Element 310. At step 899, the process may return to, for example, to FIG. 6 and step 615.

At step 615, the Pre-Rendered Elements 310 may be stored, for example, utilizing the filenames generated at step 700.

At step 620, the user may begin to interact with the Interactive Media, such as Interactive Media 325. As noted above, the interaction may be with an instance of the Interactive Media which is executed remotely relative to the Client Device 400, such as Interactive Media 325 at the Media Server 200. As noted above, the interaction may be via an Interaction Engine routine on the Client Device 400, such as Interaction Engine 475, which Interaction Engine 475 may send the user's input to, for example, the Game Server 180, which Game Server 180 executes an Interaction engine 275 and the Interactive Media 325 in an instance for the user. Interaction with the Interactive Media may require that the user and the Client Device 400 send credentials to authenticate and authorize the user and/or the Client Device 400 (or a routine executed by the Client Device 400) with respect to the Interactive Media. Such credentials or identifiers thereof may be stored in Client Device 400 and Client Device Datastore 500 as Client ID 505 and in Media Server 200 and Media Server Datastore 300 as Client IDs 335.

At step 625, user configuration parameters may be obtained relative to one or more Client Devices 400 utilized by a user. User parameters may comprise, for example, bandwidth available to the Client Device 400 in question, the Processing Unit(s) 410 in the Client Device 400 and the availability thereof, the output resolution of the Display 440 in the Client Device 400, and similar. The configuration parameters may be updated as the user interacts with the Interactive Media.

At step 630, the Game Server 180 and Interaction Engine may receive a user action or an action from another user or other input from another computer or process, which action or input is input for the Interactive Media. Examples include, movement of the user's avatar or that of another user in multi-user Interactive Media, interaction with controls for the user interface for the Interactive Media, the passage of actual or virtual time, and similar.

At step 635, the action or input of step 630 may be processed according to the Interaction Logic for the Interactive Media. The processing may be performed by the Interaction Engine on either or both of the Client Device 400 and the Game Server 180. Processing the action or input of step 630 results in the next state of the Interactive Media and a request for or providing of content, such as a request for or providing of a digital image in the frame of the then-current camera move, according to the Interaction Logic for the Interactive Media. If performed by the Game Server 180, the result of step 630 may be communicated to the Media Server 200. At step 640, the Media Server 200 looks up (or gets from the Game Server 180) the corresponding location in the Interaction Logic 330. At step 645, the Media Server 200 looks up the corresponding location in the Compositing Logic 305, to determine the required Pre-Rendered Elements 310 or live-action content required to provide the digital image requested or provided at step 635. If step 645 indicates a need for client-side or third-party graphics (such as a digital image of the user's eyes or a digital image from a third party) or other data in addition to Pre-Rendered Elements 310, then at step 650 the Media Server 200 may obtain the client-side or third-party graphics or other data. When stored in Media Server 200 and Media Server Datastore 300, the obtained client-side graphics may be stored as Client-Side Graphics 315.

At step 900, the Compositor Engine 900 (which may be executed by the Media Server 200 or the Client Device 400 or by both) composites the Pre-Rendered Elements 310 into a digital image(s) required to fulfill the content request, such as via the Compositing Server 160. Step 900 is illustrated further in FIG. 9.

Figure 9:
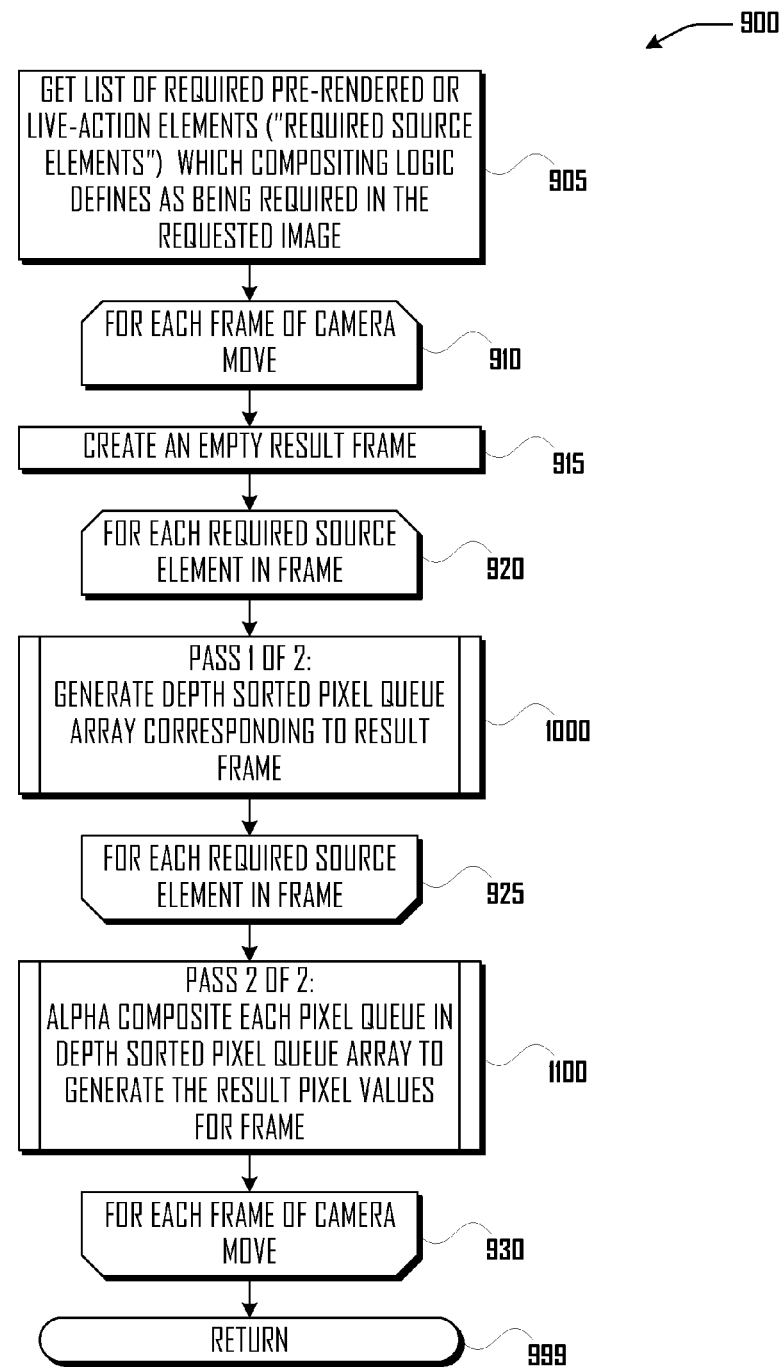
FIG. 9 is a flowchart illustrating a detail of a Compositor Engine routine or subroutine for compositing Pre-Rendered Elements, as may be practiced within the process illustrated in FIG. 6.

FIG. 9 is a flowchart illustrating a detail of a Compositor Engine routine or subroutine for compositing Pre-Rendered Elements, as may be practiced within the process illustrated in FIG. 6. At step 905, the Media Server 200, such as via the Compositing Server 160 executing the Compositor Engine 900, gets the list of required Pre-Rendered Elements 310, which the Compositing Logic 305 defines as being required to compose the requested digital image in, for example, a frame according to the then-current camera move in the then-current Scene 320. Steps 910 to 930 are iterated for each requested frame. At step 915, the Compositor Engine 900 creates an empty Result Frame corresponding to the requested frame. Steps 920 to 925 iterate for each source Pre-Rendered Element 310 in the requested frame.

At step 1000, the first of a two-part process is performed in which a Depth-Sorted Pixel Queue Array is created; the Depth-Sorted Pixel Queue Array contains Pixel Queues in an array, corresponding to the Result Frame. Each Pixel Queue in the array comprises pixels from each of the source Pre-Rendered Elements 310 which contribute to the requested frame. The Pixel Queues are sorted by pixel depth values, as described further herein. Step 1000 is illustrated further in FIG. 10.

Figure 10:
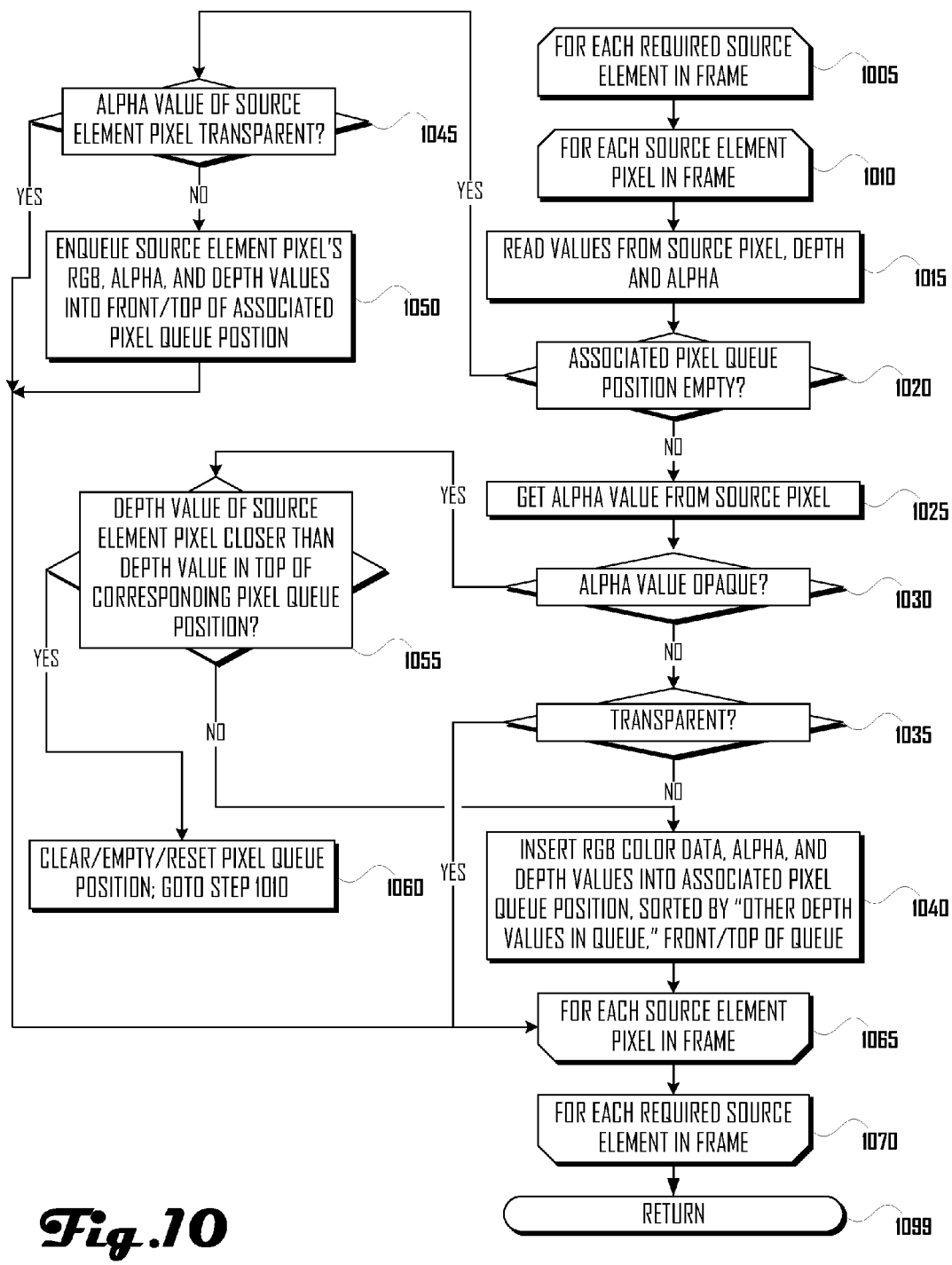
FIG. 10 is a flowchart illustrating a detail of a Generate Depth Sorted Pixel Queue Array subroutine for a first part of compositing Pre-Rendered Elements, as may be practiced within the routine illustrated in FIG. 9.

FIG. 10 is a flowchart illustrating a detail of a Generate Depth Sorted Pixel Queue Array subroutine for a first part of compositing Pre-Rendered Elements, as may be practiced within the routine illustrated in FIG. 9. Steps 1005 to 1070 iterate for each source Pre-Rendered Element required in the Result Frame. Steps 110 to 1065 iterate for each pixel in each source Pre-Rendered Element required in the Result Frame, referred to herein as a "Source Pixel." At step 1015, one or more values from the then-current Source Pixel are obtained, such as values for depth, alpha, and RGB values (the Source Pixels do not have to be obtained in a particular order, within a Result Frame). At step 1020, a determination may be made regarding whether the corresponding Pixel Queue in the Depth-Sorted Pixel Queue Array is empty, as may be the case, for example, on a first pass or if the Pixel Queue position had been cleared. If the Pixel Queue is empty, then at step 1045, a determination may be made regarding whether the Source Pixel is completely transparent, such as according to the alpha value of the Source Pixel. If the Source Pixel is not transparent, then at step 1050 the Source Pixel's RGB, alpha and depth values may be enqueued (placed into the queue of) the corresponding position in the Depth-Sorted Pixel Queue Array in the front or top position (the front or top position being the position closest to the camera) and the process may then return to iterate over the next Source Pixel. If, at step 1045, the Source Pixel is found to be completely transparent, then the process may then return to box 1010 to iterate over the next Source Pixel.

If, at step 1020, the Pixel Queue is determined to not be empty, then at step 1025, the alpha value for the Source Pixel may be obtained (if it is not already in memory from step 1015) and at step 1030 a determination may be made regarding whether the Source Pixel is completely opaque. If it is not completely opaque, then at step 1035, a determination may be made regarding whether the Source Pixel is completely transparent. If it is completely transparent, then the process may then return to iterate over the next Source Pixel; if it is not completely transparent, then at step 1040, the RGB, alpha, and depth values of the Source Pixel may be inserted into the corresponding Pixel Queue position in the Depth-Sorted Pixel Queue Array, in the front of the Pixel Queue and the process may then return to box 1010 iterate over the next Source Pixel.

If, at step 1030, the determination was that the Source Pixel is completely opaque, then at step 1055 a determination may be made regarding whether the depth value of the Source Pixel is closer than the depth value in the top position in the corresponding Pixel Queue. If it is, then at step 1060, the Pixel Queue position may be cleared (or emptied or reset), and the Source Pixel's RGB, alpha and depth values may be enqueued into the corresponding position in the Depth-Sorted Pixel Queue Array in the front or top position and the process may then return to iterate over the next Source Pixel. If, at step 1055, the determination was that the depth value of the Source Pixel is not closer than the depth value in the top position in the corresponding Pixel Queue, then at step 1040, the RGB, alpha, and depth values of the Source Pixel may be inserted into the corresponding Pixel Queue position in the Depth-Sorted Pixel Queue Array, in the front of the Pixel Queue and the process may then return to box 1010 to iterate over the next Source Pixel.

Upon completion of all iterations for all source Pre-Rendered Elements required in the Result Frame and all Source Pixels therein, at step 1099 the process may return to FIG. 9 and step 1100. Step 1100 is illustrated further in FIG. 11.

Figure 11:
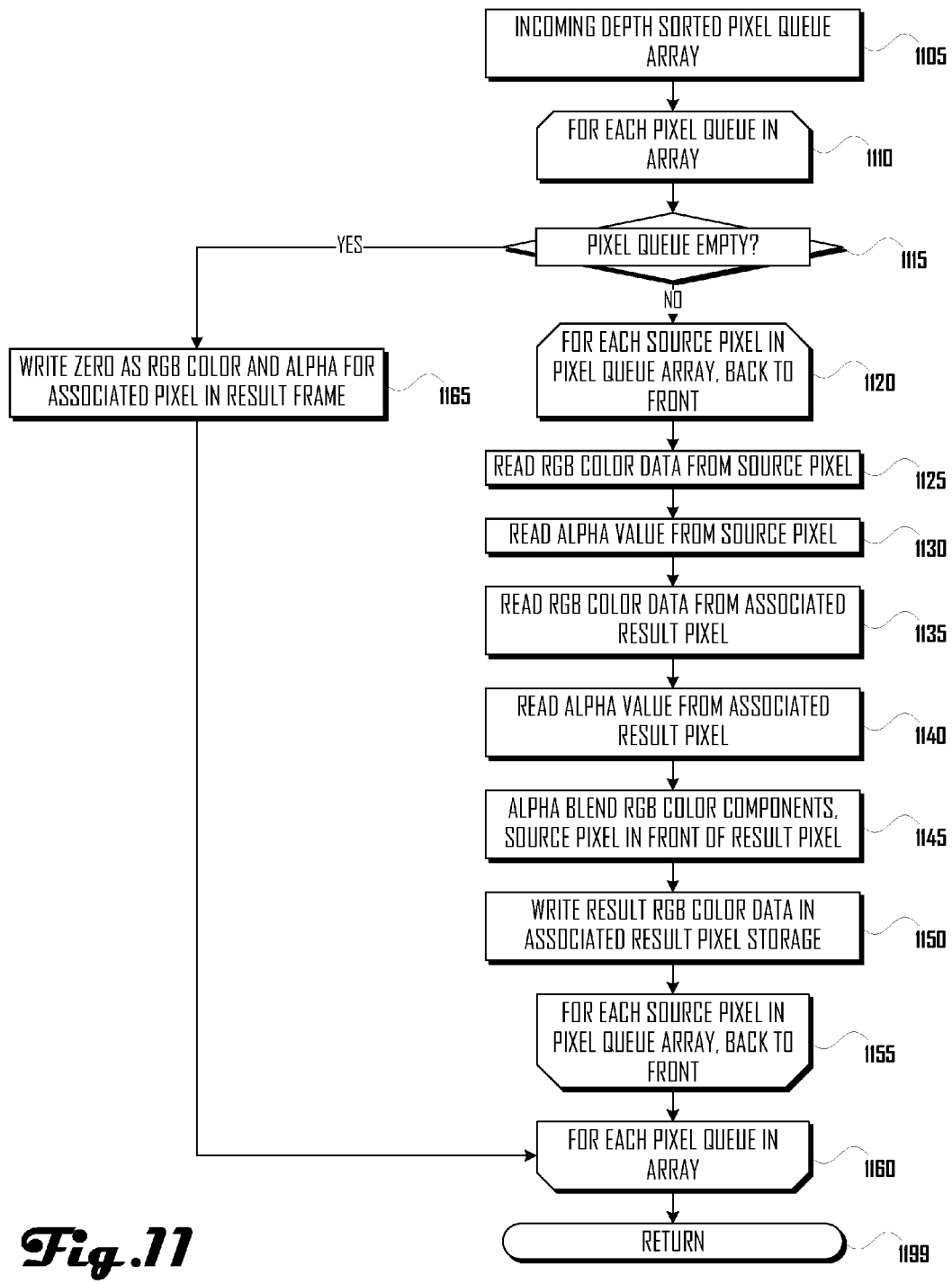
FIG. 11 is a flowchart illustrating a detail of Generate Result Pixel Values subroutine for a second part of compositing Pre-Rendered Elements, as may be practiced within the process illustrated in FIG. 9.

FIG. 11 is a flowchart illustrating a detail of Generate Result Pixel Values subroutine for a second part of compositing Pre-Rendered Elements, as may be practiced within the process illustrated in FIG. 9. In FIG. 11, the Source Pixels in the Pixel Queues in the Depth-Sorted Pixel Queue Array are alpha composited to generate the pixel values for the Result Frame, hereinafter the "Result Pixels." Step 1105 indicates that the Depth-Sorted Pixel Queue Array from step 1100 is being processed. Steps 1110 to 1160 iterate for each Pixel Queue in the Depth-Sorted Pixel Queue Array from step 1100. At step 1115, a determination may be made regarding whether the then-current Pixel Queue is empty; if it is, then at step 1165 zero (or equivalent) RGB and alpha values may be written to the Result Pixel corresponding to the Pixel Queue position in the Result Frame. If, at step 1115, the determination is that the then-current Pixel Queue is not empty, then steps 1120 through 1155 are iterated for each Source Pixel in the Depth-Sorted Pixel Queue Array, starting at the back position and proceeding to the front (toward the camera). At step 1125, the RGB values are read from the then-current Source Pixel; at step 1130 the alpha value is read from the then-current Source Pixel. At step 1135, the RGB values are read from the then-current Result Pixel; at step 1140 the alpha value is read from the then-current Result Pixel. At step 1145 the RGB color values are alpha blended, with the Source Pixel in front of the Result Pixel. An example algorithm for performing this is as follows: Result RGB values=(RGB color values for Source Pixel)(alpha value for Source Pixel)+(RGB color values for Result Pixel)(alpha value for Result Pixel) (1-alpha value for Source Pixel).

At step 1150 the Result Pixel RGB values are written to the Result Frame for the corresponding pixel position in the Depth-Sorted Pixel Queue Array and, at box 1155 and 1160, the process iterates over each Pixel Queue in the Depth-Sorted Pixel Queue Array from step 1100 and each Source Pixel therein before, at step 1199, returning to FIG. 9 and step 930. Steps 910 through 930 are iterated for each requested frame and at step 999 the process returns to FIG. 6.

At step 655, the output of step 900 is encoded to stream or saved in a file for download to, for example, the Client Device 400. At step 660, the Client Device 400 and, for example, the Client Compositing Engine 465, obtains Client-Side Graphics 515, such as an eye color, an image of the user of the Client Device 400, or the like. At step 665, the Client Render Engine 460 and/or the Client Compositing Engine 465 may render and/or composite the Client-Side Graphics 515 into the received output of FIG. 9. If compositing, the Client Compositing Engine 465 may perform some or all of the algorithms illustrated in FIG. 9 with respect to Compositor Engine 900, in which case Client Compositing Engine 465 may utilize Client-Side Compositing Logic 510 as Compositor Engine 900 utilizes Compositing Logic 305. At step 670, the Client Device 400, such as via the Display Engine 470, may output the result of step 665 to the Display 440 of the Client Device 400. At step 699, the process of FIG. 6 may conclude.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method of compositing a digital image in a computer comprising a memory, a processor, and a set of instructions in the memory, wherein the set of instructions, when executed by the processor perform the following:

by the computer, pre-rendering a plurality of objects of an interactive media instance into a plurality of pre-rendered source elements, which pre-rendered source elements comprise pixels, which pixels comprise alpha, depth, and RGB values and which interactive media instance comprises interaction rules;

by the computer, storing the plurality of pre-rendered source elements;

by the computer, receiving input, which input is determined to be a request for a digital image;

by the computer, determining a set of pre-rendered source elements required in the requested digital in age;

by the computer, obtaining at least two pre-rendered source elements from the determined set of pre-rendered source elements;

by the computer, compositing the at least two pre-rendered source elements into the requested digital image utilizing a depth-sorted pixel queue array; and transmitting the composited digital image to a client device; wherein compositing the at least two pre-rendered source elements into the requested digital image utilizing a depth-sorted pixel queue array comprises;

creating a result frame comprising a matrix of pixels corresponding to the requested digital image;

generating a depth-sorted pixel queue array corresponding to the result frame, which pixel queue array comprises pixels queues in each pixel position in the pixel queue array, which pixel queues comprise pixels from the set of pre-rendered source elements; and alpha compositing pixels in each pixel queue in the depth-sorted pixel queue array to generate pixel values which pixel values are saved in corresponding positions in the result frame.

2. The method according to claim 1, wherein the input comprises interaction input from the client device, which interaction input is processed according to the interaction rules to determine the requested digital image and wherein pre-rendering a plurality of objects of an interactive media instance into the plurality of pre-rendered source elements is performed before receiving the input from the client device.

3. The method according to claim 1, further comprising determining a finite list of the plurality of objects in the interactive media instance.

4. The method according to claim 1, further comprising determining a plurality of scenes within the interactive media instance and further comprising determining compositing logic for the interactive media instance, wherein the scenes comprise objects represented as pre-rendered source elements and wherein the compositing logic defines how the interaction rules convert the input into a request for the digital image composited from the pre rendered source elements.

5. The method according to claim 4, further comprising determining file names for the plurality of pre-rendered source elements, which file names are determined based at least in part on identifiers associated with the objects and wherein storing the plurality of pre rendered source elements comprises storing the plurality of pre-rendered source elements with the determined file names.

6. The method according to claim 4, wherein the objects comprise at least one of geometry, camera move, texture, lighting, and shading information.

7. The method according to claim 4, wherein pre-rendering a plurality of source elements of an interactive media instance further comprises determining the objects in each scene and pre-rendering the source elements for each scene utilizing the determined objects according to the compositing logic.

8. The method according to claim 1, wherein determining a set of pre-rendered source elements required in the requested digital image is according to compositing logic corresponding to the interaction rules.

9. The method according to claim 1, wherein generating a depth-sorted pixel queue array corresponding to the result frame comprises, iteratively, for each source element in the set of pre-rendered source elements and each pixel therein:

read the depth value for a pixel in the source element, and determine whether the corresponding position in the depth-sorted pixel queue array is empty.

10. The method according to claim 9, wherein the corresponding position in the depth-sorted pixel queue array is determined to be empty, then determine whether the alpha value of the source element pixel is transparent.

11. The method according to claim 10, wherein when the alpha value of the source element pixel is determined not to be transparent, then enqueue the source element pixel's RGB, alpha, and depth values into the top position of the depth-sorted pixel queue array and return to iterate over the next source element pixel; else wherein the alpha value of the source element pixel is determined to be transparent, return to iterate over the next source element pixel.

12. The method according to claim 9, wherein the corresponding position in the depth-sorted pixel queue array is determined not to be empty, then get the alpha value for the source element pixel and determine whether the alpha value is opaque.

13. The method according to claim 12, wherein the alpha value is determined to be opaque, then determine whether the depth value of the source element pixel is closer than the depth value of the pixel in the top of the corresponding position in the depth-sorted pixel queue array.

14. The method according to claim 13, wherein the depth value of the source element pixel is determined to be closer than the depth value of the pixel in the top of the corresponding position in the depth-sorted pixel queue array, then clear the pixel queue position, enqueue the source element pixel's RGB, alpha, and depth values into the top position of the depth-sorted pixel queue array and return to iterate over the next source element pixel; else determine that the depth value of the source element pixel is not closer than the depth value of the pixel in the top of the corresponding position in the depth-sorted pixel queue array, then insert the RGB, alpha, and depth values for the then-current source element pixel into the corresponding position in the depth-sorted pixel queue array and sort by depth value the source element pixels in the corresponding position in the depth-sorted pixel queue array.

15. The method according to claim 12, wherein the alpha value is determined not to be opaque, then determine whether the source element pixel is transparent; if the source element pixel is determined to be transparent, then return to iterate over the next source element pixel; else if the source element pixel is determined not to be transparent, then insert the RGB, alpha, and depth values for the then-current source element pixel into the corresponding position in the depth-sorted pixel queue array and sort by depth value the source element pixels in the corresponding position in the depth-sorted pixel queue array.

16. The method according to claim 1, wherein alpha compositing pixels in each depth-sort pixel queue in the pixel queue array to generate pixel values which pixel values are saved in corresponding positions in the result frame further comprises determining if the pixel queue in the corresponding position in the array is empty; if it is empty, then writing zero values for RGB and alpha values for the corresponding pixel in the result frame and returning to iterate over other pixel queues in the array, if any; else if it is not empty, then iteratively for each source pixel in the corresponding position in the pixel queue array, from back to front, reading the RGB and alpha values from the then-current source pixel and the then-current result pixel, alpha blending the RGB color components of the source and result pixels with the source pixel in front of the result pixel, writing the resulting RGB color data in the corresponding result pixel and returning to iterate over other source pixels in the corresponding position in the pixel queue array, from back to front, and, when there are no other source pixels in the corresponding position in the pixel queue array, then returning to iterate over other pixel queues in the array, if any.

17. The method according to claim 1, further comprising applying final visual effects to the requested digital image.

18. The method according to claim 17, wherein applying final visual effects to the requested digital image comprises obtaining client-side graphics and compositing the client-side graphics into the requested digital image.

19. A computing apparatus for compositing a digital image, the apparatus comprising a processor and a memory storing instructions that, when executed by the processor, configure the apparatus to:

by the processor, pre-render a plurality of objects of an interactive media instance into pre-rendered pixels, which pre-rendered pixels comprise alpha, depth, and RGB values and which interactive media instance comprises interaction rules;

store the plurality of pre-rendered pixels in the memory;

by the processor, receive input from a client device, which input is determined to be a request for a digital image;

by the computer, determine a set of pre-rendered pixels required in the requested digital image;

by the processor, obtain at least two of the pre-rendered pixels from the determined set of pre-rendered pixels;

by the processor, composite the at least two pre-rendered pixels into the requested digital image utilizing a depth-sorted pixel queue array; and by the processor, transmit the composited digital image to the client device; wherein composite the at least two pre-rendered pixels into the requested digital image utilizing a depth-sorted pixel queue array comprises;

create a result frame comprising a matrix of pixels corresponding to the requested digital image;

generate a depth-sorted pixel queue array corresponding to the result frame, which pixel queue array comprises pixels queues in each pixel position in the pixel queue array, which pixel queues comprise pixels from required pre-rendered pixels; and alpha composite pixels in each pixel queue in the depth-sorted pixel queue array to generate pixel values which pixel values are saved in corresponding positions in the result frame.

20. One or more non-transient computer-readable storage media having stored thereon instructions that, when executed by a computer processor and a memory, cause configure the processor to:

by the processor, pre-render a plurality of objects of an interactive media instance into pre-rendered pixels, which pre-rendered pixels comprise alpha, depth, and RGB values and which interactive media instance comprises interaction rules;

by the processor, store the plurality of pre-rendered pixels;

by the processor, receive input from a client device, which input is determined to be a request for a digital image;

by the computer, determine a set of pre-rendered pixels required in the requested digital image;

by the processor, obtain at least two of the pre-rendered pixels;

by the processor, composite the at least two pre-rendered pixels into the requested digital image utilizing a depth-sorted pixel queue array; and by the processor, transmit the composited digital image to the client device; wherein composite the at least two pre-rendered pixels into the requested digital image utilizing a depth-sorted pixel queue array comprises:

create a result frame comprising a matrix of pixels corresponding to the requested digital image;

generate a depth-sorted pixel queue array corresponding to the result frame, which pixel queue array comprises pixels queues in each pixel position in the pixel queue array, which pixel queues comprise pixels from required pre-rendered pixels; and alpha composite pixels in each pixel queue in the depth-sorted pixel queue array to generate pixel values which pixel values are saved in corresponding positions in the result frame.

* * * * *